Oct. 23, 1962 K. A. KLINGLER 3,059,940
SEAL FOR INBOARD AXLE JOURNAL BOX
Filed July 3, 1959 2 Sheets-Sheet 1

INVENTOR.
Karl A. Klingler,
BY Parker & Carter
Attorneys.

Oct. 23, 1962 K. A. KLINGLER 3,059,940
SEAL FOR INBOARD AXLE JOURNAL BOX
Filed July 3, 1959 2 Sheets-Sheet 2
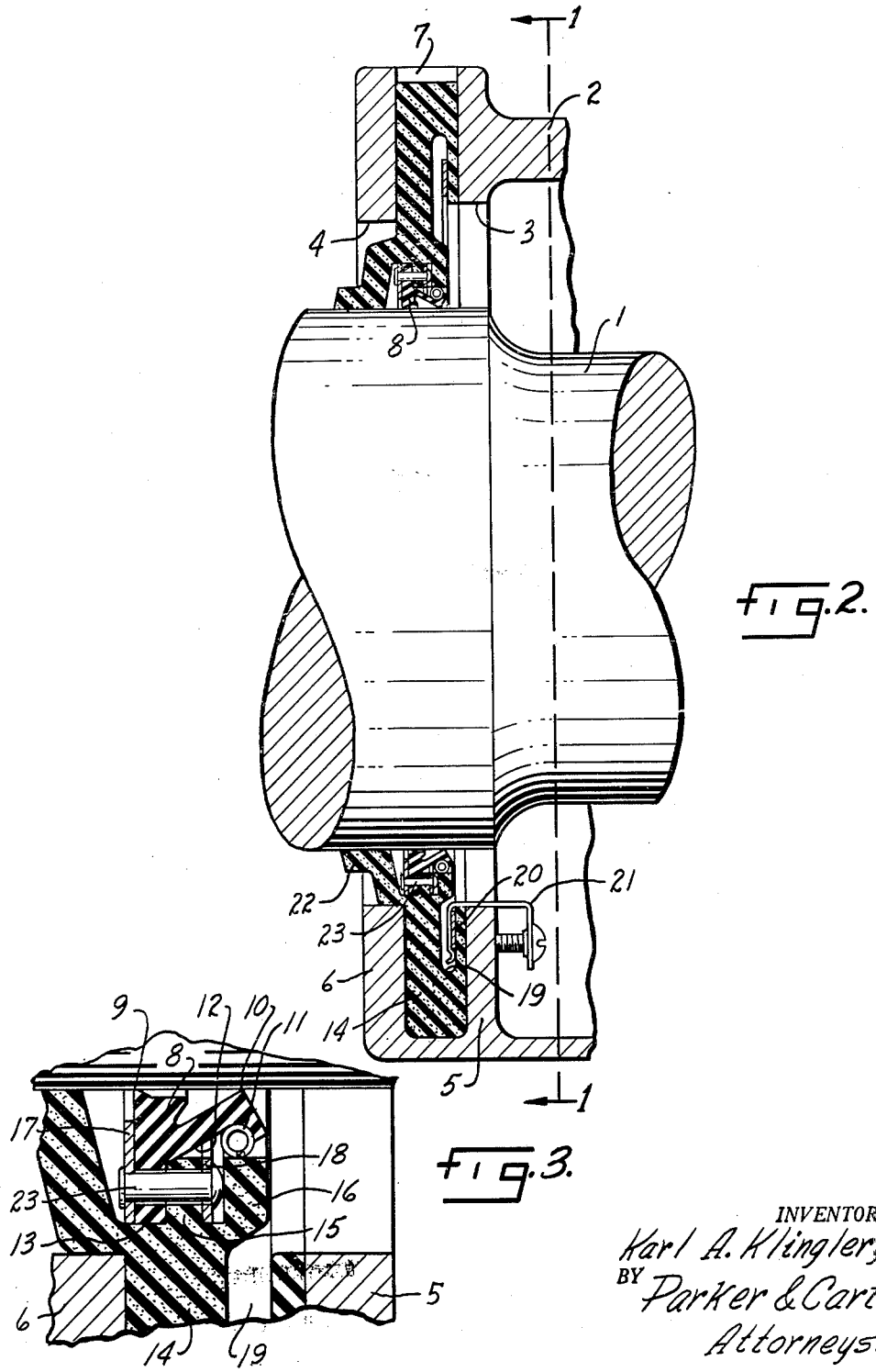
INVENTOR.
Karl A. Klingler,
BY Parker & Carter
Attorneys.

3,059,940
SEAL FOR INBOARD AXLE JOURNAL BOX
Karl A. Klingler, 111 S. Wright, Naperville, Ill.
Filed July 3, 1959, Ser. No. 824,863
3 Claims. (Cl. 277—182)

My invention relates to improvements in seals for railroad car axle journal boxes and has for one object to provide a seal which can be placed in the usual dust guard pocket at the inboard end of the journal box, will fill that pocket and will be so associated with the pocket and the axle that the escape of oil from the box will be inhibited, or entirely prevented and the entrance of dust to the box will be prevented.

One of the objects is to provide a seal which can be installed without any change or modification of the usual type of railroad car axle journal box.

Another object is to provide a seal which can be installed without the use of special skills or special tools by the usual type of labor found in a railroad yard.

The seal which I propose includes a pad of foamed, flexible, compressible material such as foam rubber or other elastomeric material. This pad is centrally apertured to surround the journal and is socketed in and fills the dust pocket. Such material will not have adequate life when in direct contact with the rotating journal or axle and therefore there is interlocked with it an annular elastomeric ring which has preferably two sealing lips contacting the journal. The elastomeric ring is interlocked with the compressible pad and is held in place by a pair of parallel annular rings of metal or other suitable material bolted or riveted to compress contacting flanges of the ring and pad together. These metal rings being annular and encircling the shaft, insure that the flanged sealing ring will always remain in circular shape and always fit the journal independent of relative radial displacement thereof. The radial movement of the axle carrying these rings with it will result in compression or stretching of the flexible pad, the pad remaining, however, at all times in place in the pocket to insure dust and oil tightness.

Other objects will appear from time to time throughout the specification and claims.

The invention is illustrated more or less diagrammatically in the accompanying drawings, wherein:

FIGURE 2 is a detail section along the line 2—2 of FIGURE 1 with parts omitted or cut away and the railroad axle in elevation;

FIGURE 3 is a section an an enlarged scale.

Like parts are indicated by like characters throughout the specification and drawings.

Figure 1:
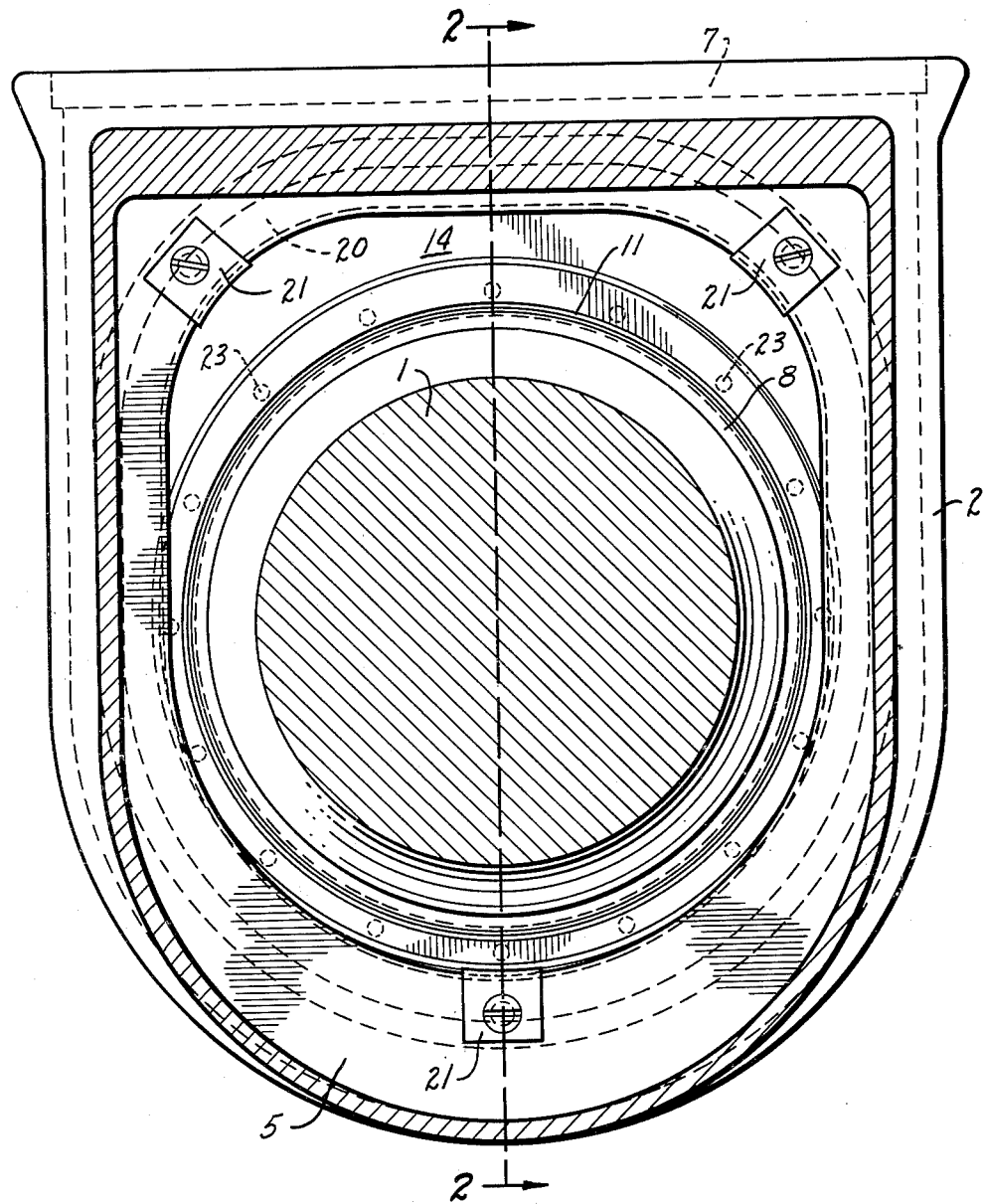
FIGURE 1 is a section through a railroad car axle journal box along the line 1—1 of FIGURE 2.

The railroad car axle 1 penetrates the journal box 2 through the registering apertures 3 and 4, in the inner and outer box walls 5 and 6, the two walls defining the usual dust pocket 7 open at the top only. The usual brass or bearing and wedge form no part of the present invention and are therefore not illustrated. The oil seal—the subject of the present invention—is contained in the pocket 7 and encircles the journal.

The oil seal comprises an elastomeric, flexible, generally incompressible ring 8 which encircles and is in oil sealing contact with the axle 1 by two axially spaced lips 9 and 10, the lip 10 being compressed against the axle by the garter spring 11 in the channel 12 in radial register with the lip 10. The ring 8 is outwardly flanged at 13 to interlock with the generally centrally apertured sponge rubber or elastomeric, compressible and extensible filler pad or diaphragm 14 which in turn is socketed in and preferably substantially fills the pocket 7. The flanged filler pad is on its inner periphery interiorly grooved to enclose the ring 8. A rib 15 extends radially from the floor of the flange, being out of contact with both walls of the groove. Axially spaced annular rings 17 and 18 of metal or other stiff material are bolted or riveted together as at 23, with the flange 13 and rib 15 held together between them to tie interlocking ring 8 and filler pad 14 together. The filler pad 14 is interiorly, radially slotted at 19, the slot extending about the entire periphery of the pad and containing a reinforcing ring 20. Clamps 21 engage the ring to press the outer part of the pad 14 bounding the slot 19 against the inner wall 5 of the pocket to hold the seal in place.

The parts might be reversed with the clamps on the outer wall 6, if desired, without affecting the operation of the seal.

The flange 22 integral with the pad 14 extends axially therefrom and encircles the axle 1 to form a dust guard ring to protect the oil seal ring 8 from outside dust, dirt or water.

I claim:

1. A seal for a railroad car axle journal box which includes a centrally apertured compressible and extensible filler body adapted to substantially fill such box, one face of the body adjacent its outer periphery being circumferentially grooved, the walls of the groove being L-shaped with the stem of the L taking the form of a circumferential pocket extending radially out from the groove, the body being annularly grooved about its inner periphery, a flange projecting inwardly from the bottom of the annular groove, a flexible generally incompressible sealing ring enclosed in the groove, means for anchoring it on the flange, the interior diameter of that part of the body on one side of the groove having an interior diameter substantially the same as the interior diameter of the sealing ring, the body on the other side of the groove having an interior diameter less than the interior diameter of the sealing ring, the sealing ring extending laterally to be overhung by such position of the body.

2. A seal for a railroad car axle journal box which includes a centrally apertured compressible and extensible filler body adapted to substantially fill such box, one face of the body adjacent its outer periphery being circumferentially grooved, the walls of the groove being L-shaped with the stem of the L taking the form of a circumferential pocket extending radially out from the groove, the body being annularly grooved about its inner periphery, a flange projecting inwardly from the bottom of the annular groove, a flexible generally incompressible sealing ring enclosed in the groove, means for anchoring it on the flange, the interior diameter of that part of the body on one side of the groove having an interior diameter substantially the same as the interior diameter of the sealing ring, the body on the other side of the groove having an interior diameter less than the interior diameter of the sealing ring, the sealing ring extending laterally to be overhung by such position of the body, clamp means penetrating the L-shaped groove and received within the circumferential pocket for holding the filler body in place.

3. A seal for railroad car axle journals comprising a centrally apertured compressible and extensible elastomeric sealing diaphragm, flanged about its inner and outer peripheries, the flange on the outer periphery extending from one side of the diaphragm, the flange about its inner periphery extending from both sides of the diaphragm, both flanges being radially grooved, both grooves being open toward the central axis of the diaphragm, a rigid reinforcing ring in the groove of the flange on the outer periphery, a rib projecting from the bottom of the groove in the inner periphery of the diaphragm, a generally incompressible elastomeric seal ring in the latter groove adapted to encircle and means for holding it in oil sealing relationship with the car axle, positive means for holding the sealed ring in position on the rib, the diameter of the circle defined by the outer periphery of the seal ring being substantially the same as the inner diameter of the diaphragm.

References Cited in the file of this patent

UNITED STATES PATENTS

| | | |
|---|---|---|
| 801,413 | Stare | Oct. 10, 1905 |
| 1,591,478 | Eaton | July 6, 1926 |
| 1,889,407 | Grisbaum et al. | Nov. 29, 1932 |
| 2,152,580 | Barrows | Mar. 28, 1939 |
| 2,798,746 | Hoyer | July 9, 1957 |
| 2,823,051 | Johnson et al. | Feb. 11, 1958 |

FOREIGN PATENTS

| | | |
|---|---|---|
| 810,549 | France | Dec. 28, 1936 |